US006941178B2

(12) United States Patent
Watson et al.

(10) Patent No.: US 6,941,178 B2
(45) Date of Patent: Sep. 6, 2005

(54) REMOTE PROGRAMMING OF SERIALIZED SEMICONDUCTOR DEVICES USING WEB OR INTERNET PROTOCOLS

(75) Inventors: David Watson, Woodlawn (CA); Francis Hong Fang Zhu, Ottawa (CA)

(73) Assignee: Mitel Knowledge Corporation (CA)

( * ) Notice: Subject to any disclaimer, the term of this patent is extended or adjusted under 35 U.S.C. 154(b) by 202 days.

(21) Appl. No.: 10/368,667

(22) Filed: Feb. 19, 2003

(65) Prior Publication Data

US 2004/0034439 A1 Feb. 19, 2004

(Under 37 CFR 1.47)

(30) Foreign Application Priority Data

Feb. 19, 2002 (GB) .............................. 0203911

(51) Int. Cl.[7] ............................................ G05B 19/18
(52) U.S. Cl. ............................ 700/65; 700/18; 700/23; 700/66; 700/86; 700/87; 717/100; 717/102; 717/114; 709/217; 709/219; 709/230
(58) Field of Search ......................... 700/17, 18, 23, 700/83, 86, 87, 88, 89, 56, 65, 66; 701/3, 4, 5; 717/100, 102, 114; 709/217, 219, 230

(56) References Cited

U.S. PATENT DOCUMENTS

| 5,068,894 | A | | 11/1991 | Hoppe |
| 5,668,591 | A | | 9/1997 | Shintani |
| 5,680,353 | A | | 10/1997 | Gaultier et al. |
| 6,047,066 | A | * | 4/2000 | Brown et al. .................. 380/2 |
| 6,249,705 | B1 | | 6/2001 | Snell |
| 6,314,023 | B1 | | 11/2001 | Waldo |
| 6,412,980 | B1 | * | 7/2002 | Lounsberry et al. ......... 378/207 |
| 2001/0041943 | A1 | | 11/2001 | Tang et al. |
| 2002/0138155 | A1 | * | 9/2002 | Bristol .......................... 700/2 |
| 2004/0167838 | A1 | * | 8/2004 | Pedersen ...................... 705/35 |

FOREIGN PATENT DOCUMENTS

| GB | 2 227 584 A | 8/1990 |
| GB | 2 283 344 A | 5/1995 |
| GB | 2 363 218 A | 12/2001 |

* cited by examiner

Primary Examiner—Ramesh Patel
(74) Attorney, Agent, or Firm—Jones Day

(57) ABSTRACT

A method and system for remote programming of serialized semiconductor devices using web or Internet protocols. Semiconductor device programmers access at least one web server for unique numbers to program the serialized semiconductor devices.

27 Claims, 4 Drawing Sheets

Figure 4

ProductId:'10312K'
AddFormat:'ANY'
Num_of_Add:'1'
SumCheFlag:'YES'
ZeroPad:'0x00'
Memory_location:'0x3ff8'
rombitFlag:'YES'
BitReverflag:'NO'
byteAdd:"YES'
res_sumchek:'NO'
Num_of_SignAdd:'1'
Location:'rndlx010'
Mac_Start_Add:'08:00:f3:00:04:94'
Mac_End_Add:'08:00:f3:00:04:9d'
Email_Add:'dave_watson'
Mac_Add_amount:'10'
ProductId:'10312K1'
Resource_Name:'Mitel'
time:'2001-12-13_11:11:04'
remAdd:'2915'
Your data has been successfully added in

Back

REMOTE PROGRAMMING OF SERIALIZED SEMICONDUCTOR DEVICES USING WEB OR INTERNET PROTOCOLS

FIELD OF THE INVENTION

This invention relates to programming of serialized semiconductor devices and in particular to a method and system for remote programming of serialized semiconductor devices using web or Internet protocols.

BACKGROUND OF THE INVENTION

Semiconductor devices have been embedded with unique numbers for a number of purposes including identification. The unique numbers are typically programmed or burned into the semiconductor devices by semiconductor device programmers. The programmers provide actual electrical connections, valid timing sequences, and correct voltages to program the semiconductor devices accordingly with unique numbers.

The semiconductor device programmers are typically operated under the control of computer controllers. A computer controller is a computer with a control logic interface. The control logic interface provides a communication interface between the computer and a semiconductor device programmer. A device program with a unique number, such as for example a MAC address, is typically programmed into each semiconductor device of serialized semiconductor devices from a set of unique numbers that has been allocated to a company.

The unique numbers are typically generated according to an algorithm using keys that produce a set of numbers which are unique, but where valid numbers are difficult for a third party to generate without the keys. For security and identification purposes, the set of unique numbers may be non-sequential and may appear to be random as related to a larger set of numbers that it was allocated/generated from. Thus, the unique numbers are typically generated by one centralized source and files of generated numbers are then provided to the computer controllers for programming into the serialized semiconductor devices.

The files of generated numbers are provided in the form of CD ROMs, diskettes, and other movable storage media. The files may also be provided by email to a person for transfer to storage media. However, it is difficult to manage multiple programming stations from different physical/geographic locations. The files have to be manually transferred to the computer controllers.

In addition, large sets of unique numbers have to be generated for each physical location of programmers in order to ensure that there is never a shortage of unique numbers. However, these unique numbers may not all have been actually programmed into the semiconductor devices, which may limit the effectiveness of certain identification or security schemes. Further the availability of files with large sets of unique numbers, which if lost or stolen, may compromise the purpose for serializing the semiconductor devices.

It is therefore desirable to provide a method and apparatus for remote programming of semiconductor devices, which address the shortcomings of providing programming of serialized semiconductor devices noted above.

SUMMARY OF THE INVENTION

According to an aspect of the present invention, there is provided a method and system for remote programming of serialized semiconductor devices using web or Internet protocols. Semiconductor device programmers access at least one web server for unique numbers to program the serialized semiconductor devices.

According to another aspect of the present invention, there is provided a system for remote programming of semiconductor devices, comprising a semiconductor device programmer for programming the semiconductor devices; and a server in communication with the semiconductor device programmer over a network to provide serialized numbers to the semiconductor device programmer for programming into the semiconductor devices.

According to another aspect of the present invention, there is provided a method of remote programming of semiconductor devices, comprising the steps of accessing a server over a network for serialized numbers; receiving a file of the serialized numbers; and programming the semiconductor devices with the serialized numbers.

According to another aspect of the present invention, there is provided a system for remote programming of semiconductor devices, comprising a semiconductor device programmer for programming the semiconductor devices; and a plurality of servers in communication with the semiconductor device programmer over a network to provide serialized numbers to the semiconductor device programmer for programming into the semiconductor devices.

According to another aspect of the present invention, there is provided a method of remote programming of semiconductor devices, comprising the steps of accessing at least one of a plurality of servers over a network for serialized numbers; receiving a file of the serialized numbers; and programming the semiconductor devices with the serialized numbers.

BRIEF DESCRIPTION OF THE DRAWINGS

The present invention will be described in detail with reference to the accompanying drawings, in which like numerals denote like parts, and in which

FIG. 4 is a representation of a typical HTTP Response Object of FIG. 3.

DETAILED DESCRIPTION OF THE PREFERRED EMBODIMENT

Figure 1:
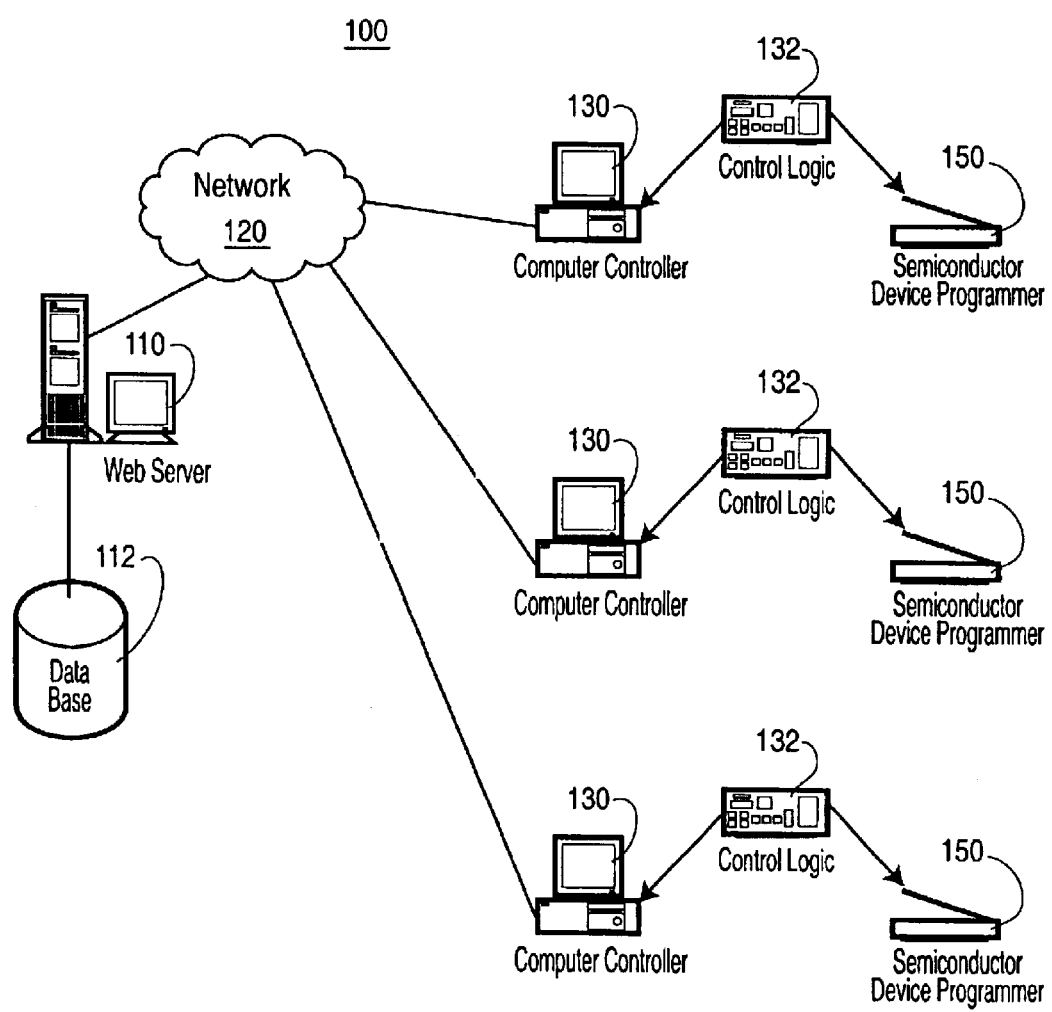
FIG. 1 is a block diagram of a system for remote programming of serialized semiconductor devices in accordance with an embodiment of the present invention.

Referring to FIG. 1, there is shown a block diagram of a system 100 for remote programming of serialized semiconductor devices in accordance with an embodiment of the present invention. The system 100 comprises a web server 110, with a database 112, connected over a network 120 to a plurality of computer controllers 130, with control logic interfaces 132, controlling a plurality of semiconductor device programmers 150. The network 120 includes the Internet and other networks, such as public or private networks, to which are connected the plurality of computer controllers 130.

The web server 110 generates unique numbers for embedding in the semiconductor devices. The unique numbers may be generated according to a number of different schemes as is known in the art. The web server 110 generates the unique numbers when requested by the computer controllers 130. Alternatively, the unique numbers may be generated and then stored in the database 112 for distribution to the computer controllers 130 when requested.

The computer controllers 130, via the control logic interfaces 132, control the semiconductor device programmers 150 to program the semiconductor devices with device programs. The device programs are embedded with the unique numbers. The device programs are transferred from the computer controllers 130 to the semiconductor device programmers 150 via the control logic interfaces 132. A computer controller 130 is typically a PC computer hosting a card, a control logic interface 132. The computer controllers 130 are connected to the web server 110 over the network 120 via standard Internet protocols.

The computer controllers 130 use network TCP/IP calls to communicate with the web server 110, such as HTML or an HTML web form, to request updates for more of the unique numbers (i.e. serialization numbers). The web server 110 responds to the computer controllers 130 (i.e. clients) with text based replies such as HTML web pages. The computer controllers 130 then extract the serialization numbers from the text-based replies to program the semiconductor devices.

The use of Internet protocols allows the system 100 to leverage existing communication networks for communication between repositories of unique numbers and semiconductor device programmers which can then be in very distant geographic locations. In addition, a single open and standard protocol may be used for accessing different sources of unique numbers to program a number of different semiconductor devices as shown in FIG. 2.

Figure 2:
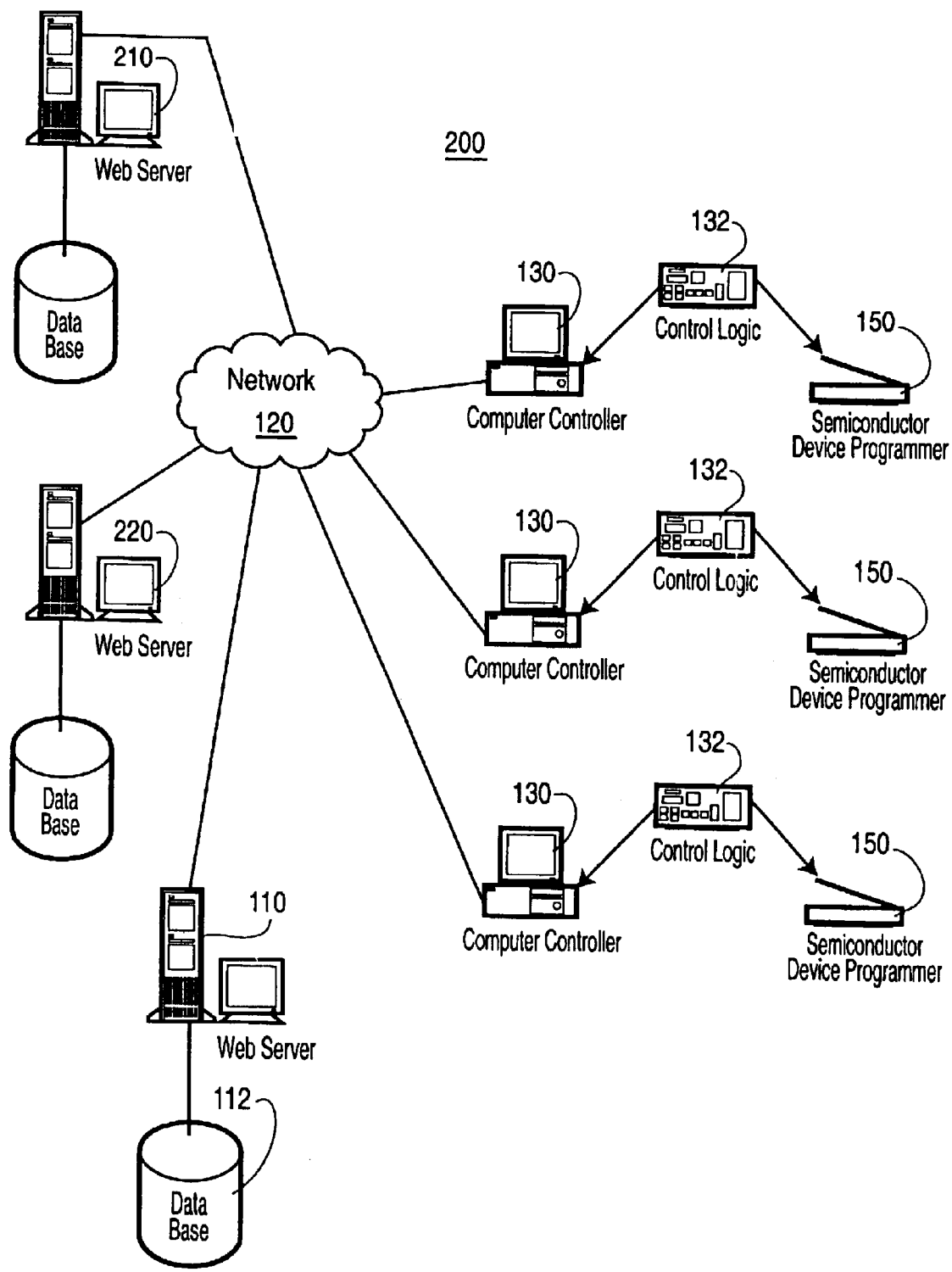
FIG. 2 is a block diagram of an enhanced system of FIG. 1.

Referring to FIG. 2, there is shown a block diagram of an enhanced system 200 of FIG. 1. The enhanced system 200 comprises the elements of system 100 with additional web servers 210, 220 connected to the network 120. The additional web servers 210, 220 are also connected over the network 120 to the computer controllers 130. The computer controller 130 accesses the desired web server, one of the web servers 110, 210, 220, for the unique numbers. A number of serializations with different schemes to generate unique numbers may be stored on each web server.

Figure 3:
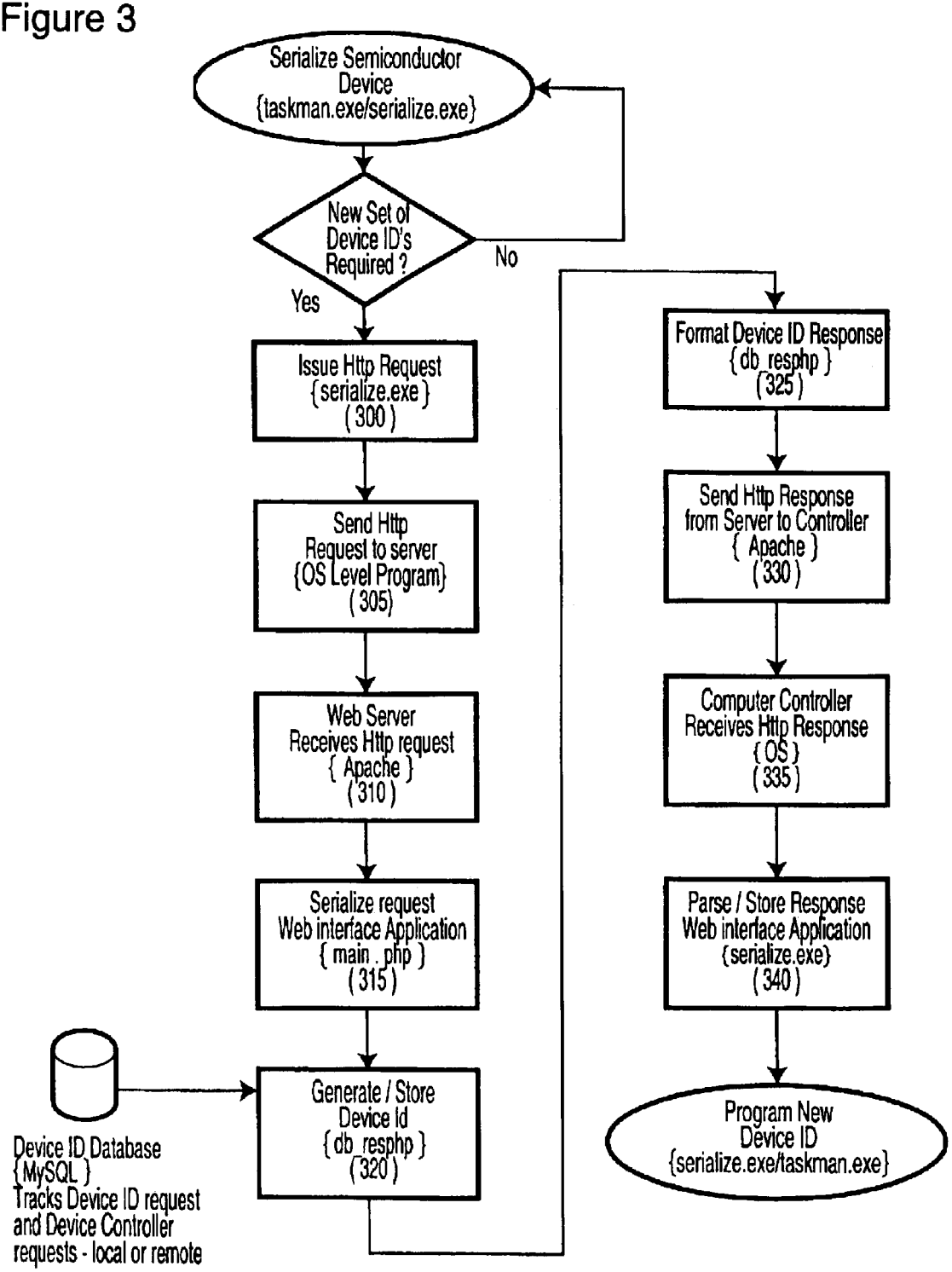
FIG. 3 is a flowchart of the steps to obtain one set of unique numbers in the system of FIG. 1.

Referring to FIG. 3, there is shown a flowchart of the steps for a computer controller 130 to obtain one set of unique numbers from the web server 110 according to the system of FIG. 1. The computer controller 130 issues a Hypertext Transfer Protocol ("HTTP") "Get" or "Post" request for one set of unique numbers (step 300). The request is sent to the web server 110 over the network 120 (step 305). The web server 110 receives the request and passes the request to an application handling such requests (step 310). The request asks the application for a web page file. The address of the file is provided as a part of the request. In response to the request for the web page file, the application creates an HTTP Response Object which includes with either a HyperText Markup Language (HTML) or Extensible Markup Language ("XML") document (step 315).

The application then generates the set of unique numbers (step 320) using a device ID database. The set of unique numbers is then formatted into a data structure (step 325). The data structure is then written to the HTTP Response Object (step 330). The HTTP Response Object is then transported over the network 120 to the computer controller 130 (step 335). At the computer controller 130, the HTML/XML document is retrieved from the HTTP Response Object and parsed for the set of unique numbers to program the semiconductor devices (step 340).

Referring to FIG. 4, there is shown a representation of a typical HTTP Response Object of FIG. 3.

It will be understood by those skilled in the art that the protocols and steps to transfer the unique numbers may be varied and that additional steps may be added such as storing information about the computer controller and the time of transfer for tracking purposes.

It will be understood by those skilled in the art that the functions of the computer controller 130 and the control logic interface 132 may be incorporated into the semiconductor device programmer 150.

The advantages of the present include centralized repositories for tracking of the semiconductor devices having the unique numbers with information, such as place and date of programming; and a neutral means of distributing the unique numbers to, for example, compatible semiconductor devices from a number of competing parties, such as for example microprocessors from Intel™ versus AMD™.

Although embodiments of the invention have been described herein, it will be understood by those skilled in the art that variations may be made thereto without departing from the scope of the invention or the appended claims.

What is claimed is:

1. A system for remote programming of semiconductor devices, comprising a semiconductor device programmer for programming the semiconductor devices;

a server in communication with the semiconductor device programmer over a network to provide serialized numbers to the semiconductor device programmer for programming into the semiconductor devices;

a computer controller for facilitating communications between the semiconductor device programmer and the server and for controlling the semiconductor device programmer to program the semiconductor devices with the serialized numbers; and a semiconductor logic interface for interfacing the computer controller with the semiconductor device programmer.

2. The system of claim 1, wherein the serialized numbers are unique numbers.

3. The system of claim 2, wherein the unique numbers are generated according to an algorithm.

4. The system of claim 3, wherein the unique numbers as provided to the semiconductor device programmer are non-sequential.

5. The system of claim 1, wherein the server is accessed using Internet protocols.

6. The system of claim 5, wherein the server is accessed using TCP/IP calls and the server responds back with files of the serialized numbers.

7. The system of claim 6, wherein the server is accessed using HTTP "Get" or "Post" requests and the server responds back with the files comprising one of HTML web pages, web page files, and XML document files.

8. A method of remote programming of semiconductor devices, comprising the steps of accessing a server using Internet protocols over a network for serialized numbers;

receiving a file of the serialized numbers; and programming the semiconductor devices with the serialized numbers.

9. The method of claim 8, wherein the serialized numbers are unique numbers.

10. The method of claim 9, wherein the unique numbers are generated according to an algorithm.

11. The method of claim 10, wherein the unique numbers are non-sequential.

12. The method of claim 8 or 9, wherein the server is accessed using TCP/IP calls and the server responds back with files of the serialized numbers.

13. The method of claim 12, wherein the server is accessed using HTTP "Get" or "Post" requests and the server responds back with the files comprising one of HTML web pages, web page files, and XML document files.

14. A system for remote programming of semiconductor devices, comprising a semiconductor device programmer for programming the semiconductor devices; and a plurality of servers in communication with the semiconductor device programmer over a network to provide serialized numbers to the semiconductor device programmer for programming into the semiconductor devices.

15. The system of claim 14, wherein the serialized numbers are unique numbers.

16. The system of claim 15, wherein the unique numbers are generated according to an algorithm.

17. The system of claim 16, wherein the unique numbers as provided to the semiconductor device programmer are non-sequential.

18. The system of claims 14 or 15, further comprising a computer controller for facilitating communications between the semiconductor device programmer and the servers and for controlling the semiconductor device programmer to program the semiconductor devices with the serialized numbers; and a control logic interface for interfacing the computer controller with the semiconductor device programmer.

19. The system of claims 14 or 15, wherein the servers are accessed using Internet protocols.

20. The system of claim 19, wherein the servers are accessed using TCP/IP calls and the servers respond back with files of the serialized numbers.

21. The system of claim 20, wherein the servers are accessed using HTTP "Get" or "Post" requests and the servers respond back with the files comprising one of HTML web pages, web page files, and XML document files.

22. A method of remote programming of semiconductor devices, comprising the steps of accessing at least one of a plurality of servers using Internet protocols over a network for serialized numbers;

receiving a file of the serialized numbers; and programming the semiconductor devices with the serialized numbers.

23. The method of claim 22, wherein the serialized numbers are unique numbers.

24. The method of claim 23, wherein the unique numbers are generated according to an algorithm.

25. The method of claim 24, wherein the unique numbers are non-sequential.

26. The method of claims 22 or 23, wherein the servers are accessed using TCP/IP calls and the server responds back with files of the serialized numbers.

27. The method of claim 26, wherein the servers are accessed using HTTP "Get" or "Post" requests and the servers respond back with the files comprising one of HTML web pages, web page files, and XML document files.

* * * * *